US005091245A

United States Patent [19]
Phillips

[11] Patent Number: 5,091,245
[45] Date of Patent: Feb. 25, 1992

[54] DEGRADABLE ABSORBENT MATERIAL

[76] Inventor: Christopher R. Phillips, P.O. Box 5667, Bellingham, Wash. 98225

[21] Appl. No.: 403,575

[22] Filed: Sep. 5, 1989

Related U.S. Application Data

[62] Division of Ser. No. 236,678, Dec. 31, 1987, Pat. No. 4,931,139.

[51] Int. Cl.$^5$ .............................................. D09H 1/58
[52] U.S. Cl. ................................... 428/221; 428/288; 428/326; 428/913
[58] Field of Search .................... 119/1; 428/221, 288, 428/326, 913

[56] References Cited

U.S. PATENT DOCUMENTS

| | | | |
|---|---|---|---|
| 4,374,794 | 2/1983 | Hok | 264/141 |
| 4,519,918 | 5/1985 | Ericsson et al. | 210/680 |
| 4,537,877 | 8/1985 | Ericsson et al. | 210/693 |

Primary Examiner—James J. Bell
Attorney, Agent, or Firm—Cassidy, Vance & Tarleton, P.S.

[57] ABSTRACT

Degradable particulate absorbent materials, together with processes for manufacture thereof, wherein the absorbent materials: i) have, in most forms of the inventions, only on the order of 0% to 10%, by weight, of inorganic solids or "fillers", and in all forms have less than 30% inorganic solids by weight; ii) are not in pellet form; iii) are characterized by an open porous fiber structure having relatively low bulk densities on the order of not more than 13 lbs./ft.$^3$ and preferably only from about 6 to about 10 lbs./ft$^3$; iv) are characterized by high rates of absorption and high absorptive capacities; v) are highly flammable both before and after absorption of liquid materials which are often themselves non-flammable and, therefore, are characterized by high heat values during recycling; vi) produce relatively little ash when incinerated, thus minimizing disposal costs and problems; and vii), readily permit of treatment to render the degradable particulate absorbent materials hydrophobic and/or characterized by their ability to remove, and/or form a barrier for, toxic and/or noxious ordorants.

4 Claims, 2 Drawing Sheets

DEGRADABLE ABSORBENT MATERIAL

The present Application is a division of Applicant's copending U.S. application Ser. No. 07/236,678 filed Dec. 31, 1987, entitled "DEGRADABLE ABSORBENT MATERIAL AND MANUFACTURING PROCESS THEREFOR", now U.S. Pat. No. 4,931,139.

BACKGROUND OF THE INVENTION

1. Technical Field

The present invention relates generally to absorbent materials and processes for the manufacture thereof; and, more particularly, to absorbent materials which are readily degradable by incineration or the like following usage as an absorbent and which may be either hydrophilic or hydrophobic in nature, thereby permitting usage of the hydrophilic forms of the invention as industrial floor sweeps, beddings for use in animal transport, kitty litter and the like, while permitting usage of the hydrophobic forms of the invention for species specific absorption purposes such, merely by way of example, as the absorption of oil spills from both land and water environments, as well as absorption of other toxic liquid materials and/or other liquid contaminants.

More specifically, the present invention utilizes, as a basic ingredient, waste cellulose fibers of the type commonly generated in wood pulping or paper making operations; and, more particularly, waste cellulose fibers having a relatively low content of inorganic solids—e.g., clays and/or other silica compounds, commonly referred to as "fillers". Preferably, the waste cellulose fibers used with the present invention include not more than 10% inorganic solids by weight and, in any event, less than 30% inorganic solids by weight. Ideally, however, the waste cellulose fibers employed with the present invention have no inorganic solids content; but, as a practical matter, the waste streams from most pulp and/or paper mills will include some inorganic solids or "fillers". Typically, such waste cellulose fiber materials having relatively low inorganic solids content are generated as a waste bi-product at the discharge end of a sulfite bleach mill used in the pulping industry such, for example, as in the pulp mill of Georgia Pacific Corporation located in Bellingham, Wash. However, as the ensuing description proceeds, those skilled in the art will appreciate that the invention is not limited to use with the discharge wastes of sulfite bleach pulp mills but, rather, can be used with such materials generated in other conventional pulping and/or paper making processes that produce low inorganic solids content in the waste outflows.

2. Background Art

Heretofore clay-based materials and other inorganic absorbents have been utilized in the control and removal of undesired liquids from industrial floors and walkways and similar industrial environments. But, such materials are not: i) sufficiently effective as determined by absorptive capacity; ii) convenient as determined by bulk density, typically 25 to 40 lbs./ft.$^3$; or iii), readily decomposable or degradable, as the wholly inorganic constituents preclude incineration even when saturated with combustible liquid material or the like.

A recent advance in absorptive media entails the pelletization of cellulose fibers and clay and/or other inorganic solids as disclosed in U.S. Pat. No. 4,374,794—Kok. However, the action of pelletizing a combination of cellulose fibers and inorganic solids or "fillers" requires use of considerable force applied to the material in order to extrude it from a die orifice. The requisite force is a compressive action that: i) eliminates interstitial spaces in the body of the pellet; ii) creates a non-porous surface; iii) creates a dimensionally stable cylindrical shape; and iv), results in a product having a bulk density typically ranging from 25 to 40 lbs./ft.$^3$. Moreover, when used as an absorptive media on floor surfaces, the extruded pellets present a hazardous rolling interface between the floor surface and pedestrian traffic. Further, such extruded pellets exhibit low absorptive capacities.

Two other patents of interest are those recently issued to Papyrus Kopparfors A.B. of Molndal, Sweden as the assignee of Thomas Ericsson, U.S. Pat. No. 4,537,877, and as the assignee of Thomas Ericsson et al, U.S. Pat. No. 4,519,918. Thus, in the Ericsson '877 patent, the patentee discloses various examples of a particulate oil-absorbing composition comprising at least 50% by weight hydrophobic cellulose pulp fibers ". . . blended with at least 30% up to 50% of an inorganic cellulose paper pulp filler . . . ". See, Col. 1, lines 48 and 49 of U.S. Pat. No. 4,537,877. Unfortunately, the inclusion of large amounts of inorganic cellulose paper pulp fillers—including particularly amounts in the range proposed by the Ericsson comprising at least 30% by weight and ranging up to 50% by weight of the basic composition—presents a number of problems. First and foremost, the inorganic solids or "fillers" tend to increase the bulk density of the resulting product which generally ranges from 16 to 20 lbs./ft.$^3$; and, as a consequence, even though the product is hydrophobic, upon saturation with oil it will not float. Moreover, the large amount of inorganic solids present tends to reduce both the rate of absorption and the absorptive capacity of the product produced. Additionally, the inorganic solids are not readily flammable and/or degradable; and, cannot be satisfactorily disposed of by incineration, thus producing a significant quantity of non-degradable ash, which creates a high-cost disposal problem, and reducing the amount of heat that can be generated per cubic volume of waste material. The inorganic solids present further create significant dust problems resulting in eye and/or breathing irritants, undesirable abrasion of production equipment and, indeed, a severe explosion hazard.

In the Ericsson '877 patent, it is proposed to render the cellulose fibers hydrophobic by sizing with rosin; whereas in the Ericsson et al '918—a patent which is subject to all of the disadvantages mentioned above which are inherent in the Ericsson '877 patent—the fibers are rendered hydrophobic by impregnation with liquid resinous materials. In both cases, no provision is made for conditioning the particulate materials to insure that the fiber ends do not project outwardly from the fibrous particles: and, as a consequence, the particulate materials of Ericsson and Ericsson et al exhibit a fuzzy surface appearance which results in breakage of fiber ends, increasing the dust problem, while causing clinging and compaction of adjacent particles.

SUMMARY OF THE INVENTION

The present invention overcomes all of the disadvantages inherent in the prior art as exemplified by the foregoing Kok, Ericsson and Ericsson et al patents by providing particulate absorbent materials which: i) in most forms of the invention have a relatively low content of inorganic materials and in all forms have less than 30% inorganic solids by weight; ii) are not in pellet form; iii) are characterized by an open porous fiber structure having relatively low bulk densities, high rates of absorption, and high absorptive capacities; iv) are highly flammable both before and after absorption of liquid materials which are often themselves non-flammable, and, therefore, are characterized by high heat values during recycling; v) produce relatively little ash when incinerated, thus minimizing disposal costs and problems; and vi), readily permit of treatment to render the absorbent material hydrophobic and/or characterized by its ability to remove, and/or form a barrier for, toxic and/or noxious odorants.

Ideally the invention contemplates the use of waste cellulose fiber materials having no inorganic solids or "fillers" at all; although, given the state of the known technology available today, it is generally necessary to use waste cellulose materials having from on the order of 2%, or less, inorganic solids by weight to on the order of 10% inorganic solids by weight, but in any event, less than 30% inorganic solids by weight. Thus, it will be understood by those skilled in the art that references in the ensuing Detailed Description and in the appended claims to waste cellulose materials having "minimal inorganic solids content" shall mean a waste cellulose material having: i) less than 30% inorganic solids content by weight even when used as a litter material where inorganic solids may be added to increase the inorganic solids content to on the order of 25% so as to increase the flushability of used litter material; ii) preferably not more than 10% inorganic solids content by weight; and iii), ideally, either no inorganic solids content or as little inorganic solids content as possible.

In carrying out the process of the present invention for forming highly degradable absorbent materials, the waste cellulose fibers are mixed with water, a latex emulsion and aluminum sulfate or other material capable of reducing the pH level, so as to form a slurry comprising approximately 96.5% water by weight and approximately 3.5% total solids by weight. A suitable flocculant is added to the slurry, preferably during transfer of the slurry to a press where excess water is removed from the slurry so as to produce a mat or press cake which is approximately 40% total solids by weight. The mat or press cake is then shredded and passed through a conditioning conveyor where the particulate shredded materials are tumbled in a water mist in the presence of a surfactant so as to condition the particulate materials by folding in projecting fibers and fiber ends to form non-fuzzy particles and to enhance the wetability thereof. The resulting particulate material is then dried to increase the solids content to preferably on the order of from 88% to 90% total solids by weight. While it is prefered to dry the particulate material to a range of from 8% to 90% total solids by weight, it is essential that the material be dried to at least 75% total solids by weight so as to minimize bacteriologic degradation; and, indeed, preferably all moisture in excess of water of hydration is removed.

A degradable absorbent material produced in accordance with the foregoing process will be hydrophilic by nature, having a relatively low bulk density which is preferably on the order of from about 8 to 10 lbs./ft.$^3$ as contrasted with the bulk densities inherent in the Ericsson and the Ericsson et al products which range from 16 to 20 lbs./ft.$^3$. The lower bulk density serves to substantially enhance the absorptive capacity of the product; and, when the product is treated to render it hydrophobic, serves to ensure that the product will float on water for prolonged periods of time, even when saturated with oil, so as to permit the ready absorption and retention of oil and similar liquids in a floating environment. Moreover, the substantially reduced amount of inorganic solids present in the product of the present invention as contrasted with prior products ensures ready degradation of the product after use by incineration or the like, thus maximizing heat values produced and minimizing the quantity of ash that must be disposed of as well as attendant disposal costs.

When used as a litter material for cats and similar animals, inorganic solids may be added to the slurry so as to increase the total inorganic content of the solids in the slurry to approximately 25% of the total solids present by weight but, in any event, less than 30% of the total solids present by weight, thus enhancing the flushability of used litter material. Moreover, when used as either a litter material or as a bedding material for animals, or when used as an absorbent for other noxious and/or odoriferous waste materials, the absorbent material of the present invention can incorporate a suitable deodorant and/or vapor barrier which either serves to absorb noxious fumes and/or odorants or to prevent dissemination thereof into the surrounding atmosphere.

When it is desired to convert the absorbent material of the present invention to one that is hydrophobic in nature, it is possible to add resins and/or other water repellants to the material—preferably water repellants that are species specific with regard to attraction of the liquids to be absorbed. Alternatively, plastic materials may be added to the basic absorbent material of the present invention so as to render the material hydrophobic in nature.

DESCRIPTION OF THE DRAWINGS

These and other objects and advantages of the present invention will become more readily apparent upon reading the following Detailed Description and upon reference to the attached drawings, in which.

Figure 1:
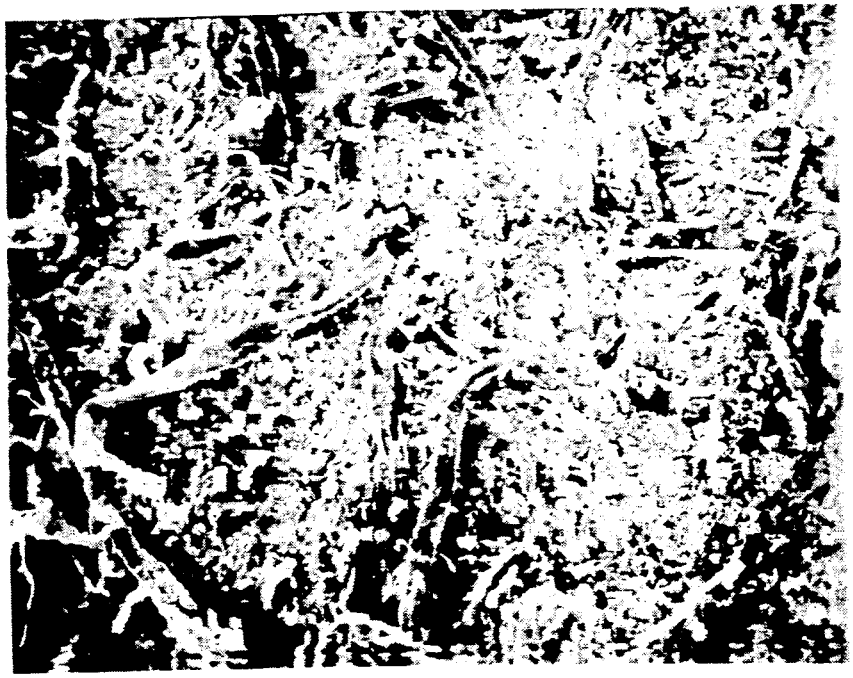
FIG. 1 is a microphotograph (200× magnification) depicting a typical conventional prior art absorbent material of the type resulting from the processes disclosed in the foregoing Ericsson and/or Ericsson et al patents, here particularly illustrating the presence of clays and other inorganic solids or "fillers" tending to fill the interstitial spaces between the randomly oriented fibers.

While the invention is susceptible of various modifications and alternative forms, specific embodiments thereof have been shown by way of example in the drawings and will herein be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

DETAILED DESCRIPTION

In accordance with one of the important aspects of the present invention, provision is made for forming readily degradable absorbent materials from waste cellulose fibers having minimal inorganic solids content—i.e., less than 30% inorganic solids by weight, preferably less than 10% inorganic solids by weight, and ideally at or approaching 0% inorganic solids by weight—and where such readily degradable absorbent materials are: i) loose and porous, having a bulk density of less than 13 lbs./ft.$^3$ and preferably in the range of from 6 to 10 lbs./ft.$^3$; ii) characterized by their high rate of absorption and high absorptive capacity; iii) characterized by their high flammability and their propensity for ease of disposal after use by conventional incineration processes which, because of the flammable nature of the product and the presence of minimal levels of inorganic solids or "fillers", create usable high heat values and produce minimal ash, thus minimizing waste disposal problems and costs; iv) conditioned to eliminate problems inherent with prior art processes and/or products wherein the fibers and fiber ends project out of the particulate material; and v), which readily permit of the use of process additives to render the degradable absorbent material hydrophobic and a species specific attractant to non-water liquid contaminants, as well as highly effective in removing and/or serving as a barrier for noxious and/or odoriferous contaminants. Suitable waste cellulose fibers can be obtained from sulfite, sulfite-acid, groundwood, sulfate, thermomechanical and kraft process mills for forming pulp, as well as from a variety of other paper making operations; and, the types of inorganic solids which are commonly present in such waste cellulose fiber materials include, but are not limited to, kaolin, China clay, talc, calcium carbonate and silica mineral complexes; but, as previously indicated, it is preferable to employ a waste cellulosic fiber material having a minimal content of inorganic solids of the foregoing types.

In keeping with this aspect of the invention, the process initially involves the formation of a slurry comprising approximately 96.5% water and approximately 3.5% total solids by weight wherein the solids content of the slurry comprises: i) waste cellulose fibers having minimal inorganic solids content and constituting in the range of 94% to 99.5% and, preferably, approximately 99% by weight of total dry solids; ii) a suitable latex emulsion to promote adhesion of the fibers one to another and constituting in the range of about 0.5% to 5%, and preferably approximately 1%, of total dry solids by weight; and iii), a suitable acidic material in such quantity as required to reduce the pH level of the slurry to in the range of from about 4.5 to 5.5. To this end, the waste cellulose fibers having minimal inorganic solids content are added to water in any suitable agitation tank. Thereafter, the requisite amount of latex emulsion is added to the slurry. While those skilled in the art will appreciate that a wide variety of latex emulsions can be employed to promote adhesion of the fibers one to another, particularly advantageous results have been obtained when using a water insoluble latex emulsion marketed by Dow Chemical U.S.A. of Midland, Mich. under the product designation DL244A. Thereafter, a suitable acidic material is added to the slurry, as required, in order to adjust the pH level down to a range of from 4.5 to 5.5. Again, those skilled in the art will appreciate that a wide variety of acidic additives can be employed; but, excellent results have been achieved using, for example, aluminum sulfate or "Alum" [$Al_2(SO_4)$] which is marketed by Stauffer Chemical Co. of Westport, Conn.

In carrying out the process of the present invention to form industrial grade hydrophilic liquid absorbents which are readily degradable and attain the objectives of the invention, the slurry produced in the agitation tank is, after sufficient agitation to insure a homogeneous mix of the slurry constituents, transferred to a conventional press to dewater the slurry and form a mat or press cake having in the range of 30% to 45%, and preferably on the order of about 40%, total dry solids by weight. Those skilled in the art will appreciate that the press may take many well known, conventional and commercially available forms—e.g., a V-press, a screw press, a vacuum drum, or the like—but, excellent results have been achieved using a conventional high-pressure belt press of the type manufactured by Parkson Co. of Fort Lauderdale, Fla. and marketed under the product designation Magnum Series 3,000–2.0.

To promote flocculation of the solids content of the slurry and adhesion of the fibers one to another, it has been found desirable to add a suitable flocculating agent to the slurry produced in the agitation tank prior to delivery thereof to the press. Such flocculating agent may take various forms; but, particularly desirable results have been achieved when using Polymer 1264 manufactured by Betz Paper Chem, Inc. of Jacksonville, Fla. as a flocculating agent. Such flocculating agent may be added to the slurry in the agitation tank; but, is preferably added to the slurry as it is transferred from the agitation tank to the press. The quantity of flocculating agent added may vary widely dependent upon such diverse variables as the type of flocculating agent employed, the nature and content of the slurry, etc. However, it has been found that the quantity of flocculating agent is not critical provided only that as the flocculating agent is added to the slurry, the operator visually observes the slurry; and, when floccuation or "clumping" of the fibers is observed, accompanied by clearing of the water which theretofore exhibited a milky appearance due to the presence of the latex emulsion, the addition of further flocculating agent can be terminated.

During the next step in the process, the press cake output from the conventional press is shredded to form discrete particles exhibiting predominantly flat planes by means of a dual shaft counterrotating shredding device incorporating circular toothed blades. Such a shredding device is completely conventional and may take the form of a shredder of the type manufactured by Miller Franklin Co. of Livingston, N.J. and marketed under the trademark "TASKMASTER". Again, however, those skilled in the art will recognize that other readily available particulating devices may be substituted without departing from the teachings of the present invention.

The flat planed discrete particles of absorbent material composed of randomly aligned fibers and minimal inorganic solids formed by the non-compressive shearing action of the shredding device are then conveyed to a conventional screw conveyor wherein the particles are conditioned by tumbling in the presence of a water mist so as to cause the loose fibers and fiber ends protruding from the flat planes and edges of the particles to be combined with the body thereof, thus converting the fuzzy particles produced by the shredder to non-fuzzy particles. Moreover, in carrying out this aspect of the invention, it has been found desirable to apply a water soluble surfactant to the liquid absorbent particles so as to enhance the wetability thereof. While numerous surfactants may be employed, excellent results have been attained with a surfactant manufactured by Betz Paper Chem, Inc. of Jacksonville, Fla. and designated as DPS1104. The amount of surfactant added is not critical and is a matter of choice; but, the desired results have been found to be achieved when using a water soluble solution containing approximately 0.5% surfactant by weight which is applied to the absorbent particles as they are tumbled in the water mist during transit through the conditioning screw conveyor. Those skilled in the art will recognize that other conventional devices can be employed to impart a tumbling action to the particles without departing from the teachings of the present invention.

Figure 2:
FIG. 2 is a microphotograph (200× magnification) illustrating the fibrous array in absorbent materials made in accordance with the present invention, and emphasizing particularly the absence of inorganic solids present in the interstitial spaces between adjacent fibers.
Figure 3:
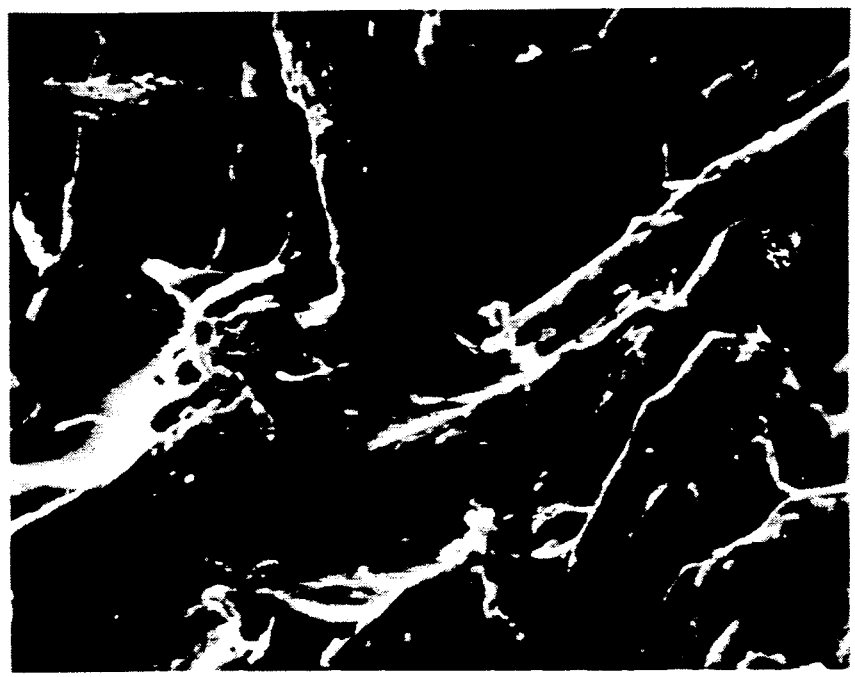
FIG. 3 is a highly magnified (500× magnification) microphotograph here illustrating the conventional prior art absorbent material inherently produced in accordance with the processes of the foregoing Ericsson and Ericsson et al patents, and emphasizing particularly both the presence of inorganic solids in the interstitial spaces between adjacent fibers and the tendency of the fibers and fiber ends to project randomly out of the surface of the particulate material; and, FIG. 4 is a highly magnified (500× magnification) microphotograph of an absorbent material made in accordance with the present invention, here particularly emphasizing both the lack of inorganic solids present within the product and the absence of randomly oriented fibers and fiber ends projecting out of the particulate material.
Figure 4:

The random alignment of fibers in conjunction with the non-compressive shearing action of the press cake by the shredding device and the non-compressive action in the conditioning screw conveyor ensures that the liquid absorbent particles retain, upon drying, a thorough distribution of open interstitial spaces within the particle interiors and an open, porous surface as clearly illustrated in FIGS. 2 and 4, especially when contrasted with the conventional prior art processes of the Ericsson and/or Ericsson et al type as depicted in FIGS. 1 and 3.

Drying of the particles is accomplished in a fluidized bed dryer of conventional manufacture and available from such entities as, for example: Carmen Ind. of Jeffersonville, Ind.; and, Dresser Industries of Hillsboro, Oreg., utilizing an inlet airstream temperature in the range of 170° C. to 240° C. and, preferably, 180° C. to 200° C. The particles exit the dryer after a residence time of approximately six (6) minutes with a total dry solids content in excess of 75% by weight, preferably in the range of 80% to 92% by weight, and most preferably in the range of from 88% to 90% by weight.

The final bulk density of the liquid absorbent particles is, of course, a function of the origin of the fibers, the ratio of inorganic solids to organic fibers by weight, and the final total dry solids content. Such variables may be adjusted, as desired, to better suit the material to specific applications. However, an acceptable range is equal to, or less than, 13 lbs./ft.$^3$, with a preferred bulk density ranging from 6 to 10 lbs./ft.$^3$

EXAMPLE I

A general purpose industrial grade liquid absorbent embodying features of the present invention was made as follows:

First, waste cellulose fibers having minimal inorganic solids content were obtained from a sulfite-acid pulping facility having a waste discharge stream containing a total solids content of 28% with an inorganic solids content of 5%. A 400 gallon batch of slurry was prepared as described above by addition of sufficient water to the cellulose fibers in an agitation tank to produce a water/fiber slurry containing 96.5% water and 3.5% total dry solids; and, wherein the total dry solids comprised: i) approximately 99% organic cellulose fibers having minimal inorganic solids content (5%); ii) approximately 1% of water insoluble latex emulsion (DL244A); and iii), a small quantity of Alum sufficient to reduce the pH value of the slurry to approximately 5. The resultant slurry was then transferred to a Parkson Co. belt press while a small amount of flocculant (Polymer 1264) was added sufficient to evidence initiation of visibly observable flocculation of the solids and clarification of the milky appearance of the water resulting from the latex added to the original slurry. The resultant slurry and flocculant was dewatered in the Parkson Co. belt press to form a press cake containing 40% total solids by weight. Thereafter, the press cake was shredded in a Miller Franklin TASKMASTER shredder, conditioned in a screw conveyor under the influence of a water mist containing 0.5% surfactant (DPS1104), and dried to 90% total dry solids.

The resulting liquid absorbent material manufactured in accordance with the present invention was then compared with conventional clay floor sweeps purchased locally with three varieties of pellets designated herein as "A", "B" and "C", each of which were composed of cellulose and inorganic solids and which are available commercially from various retail establishments located throughout the United States. The comparative bulk densities of the product of the present invention and commercially available pellets "A", "B" and "C" are set forth in Table I below, while the superior absorptive abilities of the liquid absorbent media produced in accordance with the present invention as compared with those of the pellets "A", "B" and "C" are listed in Table II below.

TABLE I

| | Bulk Density lb./ft.$^3$ | | | | |
|---|---|---|---|---|---|
| | Present Invention | Clay as Tested | Pellet A | Pellet B | Pellet C |
| lbs./ft.$^3$ | 7.0 | 27.7 | 25.24 | 32.28 | 38.06 |

TABLE II

| | Absorptive Capacity % by weight (uptake media, standard hydraulic oil) | | | | |
|---|---|---|---|---|---|
| | Present Invention | Clay as Tested | Pellet A | Pellet B | Pellet C |
| 1 minute | 290 | 100 | 66 | 61 | 29 |
| 1 hour | 293 | 100 | 77 | 70 | 31 |
| 16 hours | 301 | 109 | 83 | 71 | 31 |

As can be readily discerned from the comparative figures set forth in Tables I and II above, the absorbent media prepared in accordance with the present invention is far superior to conventional commercially available pellets in absorption capacities and lighter in weight given comparative volumes. In an industrial situation, time is of the essence in containing liquid spills. Often the limiting factor in containment and cleanup response is the weight-carrying ability of an employee. Utilizing the absorptive media of the present invention, an employee will be able to deliver from two (2) to three (3) times the volume of absorptive media to a spill location in a given period of time with a consequent significant increase in absorptive capacity. Further, the absorptive media prepared in accordance with the present invention does not present a round rolling interface between the floor surface and pedestrian traffic. As such, the present invention exhibits many advancements over the known prior art as exemplified by, for example, the commercially available pellets designated "A", "B" and "C" and/or the pellets disclosed in the aforesaid U.S. Pat. No. 4,374,794—Kok.

The absorbent media of the present invention was then compared with absorbent media of the type disclosed in the foregoing Ericsson patent. The bulk density of the absorbent media of the present invention was, as indicated above, 7.0 lbs./ft.$^3$; whereas the bulk density of the Ericsson absorbent material was 19.36 lbs./ft.$^3$. In terms of absorptive capacity, the present invention exhibited the capacity to absorb an amount of standard hydraulic oil equal to 290% of its weight in only one (1) minute as compared with 301% in sixteen (16) hours—viz., the absorbent material of the invention reached virtually its full capacity of absorption in only one (1) minute. The Ericsson material, on the other hand, was capable of absorbing an amount of the standard hydraulic oil equal to only 133% of its weight in one (1) minute and did not reach its maximum capacity of 156% of its weight until sixteen (16) hours, thus clearly demonstrating the superior absorbing characteristics of the present invention, both in terms of total absorptive capacity and rate of absorption.

Finally, the absorbent media of both the present invention and of the Ericsson process were then subjected to incineration. The quantity of total ash produced with the present invention was only 9.6% by weight of the material subjected to incineration; whereas, the total ash produced from the Ericsson material represented 44% of the material incinerated, thus again clearly evidencing the superiority of the present invention over the known prior art.

Moreover, the striking differences between the absorbent media of the present invention and those disclosed in the aforesaid Ericsson '877 and Ericsson et al '918 patents are readily discernable merely by side-by-side visual comparison of highly magnified microphotographs of the two products. Thus, referring to FIGS. 1 and 3 which respectively depict the Ericsson absorbent media at 200× and 500× magnification, one can readily observe that the interstitial spaces between adjacent fibers contain large amounts of inorganic solids consistent with Ericsson's teaching that his media must contain ". . . at least 30% up to 50% of an inorganic cellulose paper pulp filler . . . " See, Col. 1, lines 48 and 49 of U.S. Pat. No. 4,537,877. Moreover, as is made particularly evident upon inspection of FIG. 3, it will be observed that the randomly oriented fibers and fiber ends are not laid into the body of the absorbent media particle, but, rather, project out of the body of the particle producing a fuzzy particle which is subject to breakage of the protruding fibers, thereby creating a severe dust problem and producing clinging, agglomeration and compaction of the absorbent media particles.

Referring on the other hand to FIGS. 2 and 4 which respectively depict the absorbent media of the type produced in Example I of the present invention, one can readily observe that the interstitial spaces between adjacent fibers are essentially devoid of inorganic solids or "fillers". Thus, the particles are characterized by their open internal structure and a porous surface defined by randomly oriented fibers wherein the fibers and fiber ends are laid into the particle body as a result of passage through the conditioning conveyor in the presence of a water mist. As a consequence, the absorbent media of the present invention is not fuzzy and is essentially dust free.

EXAMPLE II

A liquid absorbent material was prepared in accordance with the present invention in the same manner as that described above in connection with Example I except that in this instance 0.75% by weight of a water soluble deodorizing chemical commercially available from Cox Family Laboratories, Inc. of Lynden, Wash., and marketed under the trademark "CONTACT", was added to the product during transit through the screw-type conditioning conveyor. The resulting dried absorbent material was then tested for use as an animal bedding material. To this end, 48 lbs. of liquid absorbent material were distributed evenly throughout a pen 6'×8' (48 sq. ft.), forming a bedding of approximately 2" in depth. Fifteen (15) mixed breed pigs weighing approximately 20 lbs. each were placed in the pen and provided with water, but with no feed. The pigs were left in the pen for a period of 24 hours. It was noted that at the outset the test pigs chewed on the absorbent material; but, that did not continue after the first hour or so. Throughout the test period the absorbent material maintained its absorbency and resiliency; and, no dust was observed. The pigs were observed for four days following the test and showed no ill effects. Based upon the observations made during this test, the absorbent material of the present invention appeared to work as an excellent bedding for shipping swine via air; and, of course, the lightness in weight of the material attributable to its low bulk density as contrasted with the bulk density of other conventional bedding materials, is a contributing factor to minimal cost for air freight charges.

EXAMPLE III

A liquid absorbent material was formed in accordance with the process as described above for Example II except that in this instance the inorganic solids content of the waste cellulose fibers (which were input to the slurry at 5% inorganic solids) was adjusted upwardly by the addition of silica sand having an 8 micron mean size to raise the total content of inorganic solids in the slurry to 28%, thus reducing the content of organic cellulose fibers to approximately 71%. The amount of latex emulsion and Alum remained unchanged, as did all other variables in the process.

The resulting liquid absorbent material exhibited a bulk density of 11.7 lbs./ft.$^3$ and showed an absorptive capacity of 204% of its weight after one minute, 209% after one hour, and 213% after 16 hours. The material has proved excellent as a flushable kitty or pet litter since the addition of inorganic solids increased the bulk density to a level which enabled used litter material to be readily flushed down a toilet, whereas the materials of Examples I and II tend to float on the surface of the toilet water unless left unflushed for a sufficient period of time as to be completely wetted by the water.

EXAMPLE IV

A hydrophobic liquid absorbent material was prepared as follows:

A water/solids slurry containing 96.5% water and 3.5% total solids was prepared in precisely the same manner as described above in conjunction with Example I except that in this instance the solids were sized by the addition of Nuepfor 635, a resin material marketed by Hercules Incorporated of Wilmington, Del. To this end, approximately 3% resin by weight was added to the slurry, reducing the content of waste cellulose fibers in the slurry to approximately 96%. The quantity of latex and Alum remained the same. After suitable agitation, the slurry was transferred to the press in precisely the same manner described above for Example I; but, in this instance a water insoluble ionic wax was added to the slurry during the transfer in a quantity comprising 1.5% of the total solids present in the slurry. While those skilled in the art will appreciate that various types of water soluble ionic waxes may be added to the slurry, excellent results were achieved when using either Paracol 802N or Paracol 700N, ionic waxes available from Hercules Incorporated of Wilmington, Del. The water content of the slurry was then reduced in the belt-type press to form a press cake constituted by 40% total solids and was shredded in precisely the same manner as described above in Example I. As the shredded particulate material was passed through the conditioning conveyor, a non-ionic wax emulsion was sprayed on the tumbling particulate material in an amount equal to 4% of the material's weight along with the surfactant. Again, those skilled in the art will appreciate that various types of non-ionic waxes may be employed to enhance the hydrophobicity of the product; but, excellent results have been observed when the non-ionic wax was comprised of either Cascowax EW403H as provided by Bordon, Inc. of Columbus, Ohio or a silicon material manufactured by Union Carbide Corporation of Sistersville, W. Va. marketed under the product designation LE9300. The product was then dried in precisely the same manner described above in connection with Example I.

The resulting product was then tested for its ability to absorb oil spills on water. The product had a bulk density of 7.4 lbs./ft.$^3$; and, when placed in water containing an oil spill, readily floated. Indeed, the product remained floating long after all oil had been absorbed; effectively absorbed a quantity of oil equal to 246% of its weight in less than 16 hours; and, thereafter remained floating for a sufficient period of time to have permitted its removal from the water with all absorbed oil. However, the absorbent material with the absorbed oil was permitted to remain in the water. It was noted that after 24 hours, some sinkage began to occur; but, all of the material did not sink until two (2) weeks had elapsed. After sinkage, the product exhibited some propensity to release a portion of the absorbed oil.

Those skilled in the art will appreciate that the quantities of the process additives used in Example IV are not critical, and may be varied as desired and/or required. For example, while the amount of resin (Nemphor 635) added to the slurry in Example IV was 3% resin by weight, excellent results have also been obtained using both less and more resin—for example, from 2% or less to 4% or more resin. Similarly, the amounts of ionic and/or non-ionic wax employed may also differ from the quantities used in Example IV dependent on the results desired.

EXAMPLE V

A second hydrophobic absorbent material embodying features of the present invention was manufactured as follows:

A water/solids slurry was prepared in precisely the manner described above in Example I. Thereafter, the slurry was transferred to a Parkson Co. belt press for dewatering in the manner previously described; but, as the slurry was transferred, 3% by weight of a liquid plastic of the type manufactured by Betz Paper Chem, Inc. of Jacksonville, Fla. and marketed under the product designation DPS863C was added to the slurry. The product was then dewatered, shredded, conditioned and dried in precisely the manner described in Example I.

The resulting product had a bulk density of 7.7 lbs./ft.$^3$, an affinity for oil spilled on water and an absorptive capacity for oil of 326% of its weight after one minute, 330% after one hour, and 336% after sixteen (16) hours, by which time all oil in the spill had been absorbed. As in Example IV, it was noted that product sinkage did not begin until more than 24 hours after the absorbent material was placed in the water—i.e., long after full absorption had occurred, thus permitting ample time to have removed the product and the absorbed oil. Indeed, sinkage of all of the absorbent media did not occur for three (3) weeks; and, even then the product retained all of the absorbed oil and none was released.

One additional advantageous application for liquid absorbent materials embodying features of, and made in accordance with, the present invention comprises usage as a shock absorbent packing material for packaging containers—particularly containers of noxious and/or toxic chemicals and/or liquids. Thus, the absorbent media of the present invention is both suitable and highly effective as a replacement for conventional packing materials such as "vermiculite", an expanded silica material containing fibrous silica dust in the form of asbestos. Not only is the absorbent material effective for its shock absorbing properties, but, moreover, in those instances where the containers leak, the absorbent media of the present invention serves to effectively absorb and retain the leaking liquid, thereby preventing hazardous spills which might otherwise occur—all without any dust problem and particularly without distribution of hazardous asbestos dust.

Thus, those persons skilled in the art will appreciate that there have herein been disclosed improved processes for forming improved liquid absorbent media which may be either hydrophilic or hydrophobic and which, in either case, are characterized by: i) their loose porous cellulose fiber structure essentially devoid of appreciable amounts of inorganic solids or "fillers"—i.e., a cellulose fiber structure having minimal inorganic solids content as closely approximating 0% inorganic solids by weight as possible (except where inorganic solids are added to such material when intended for use as kitty litter or the like to improve flushability of used litter) and, in any event, less than 30% inorganic solids by weight; ii) a relatively low bulk density (not more than 13 lbs./ft.$^3$ and preferably 6-10 lbs./ft.$^3$); iii) high absorption rates and capacities; iv) high flammability and consequent high heat values produced when incinerated with attendent minimal ash and disposal costs; and v), lack of a fuzzy surface texture with consequent reduction of dust and attendant irritation to humans and abrasion of equipment, as well as reduced explosion hazards.

I claim:

1. A degradable liquid absorbent material comprising waste cellulose fiber materials having minimal inorganic solids content and characterized by having: i) a bulk density of not more than 13 lbs./ft.$^3$; ii) extensive open and unfilled interstitial spaces on the surface and throughout the interior of the degradable liquid absorbent material; and iii), surface fibers and fiber ends laid into the body of the degradable liquid absorbent material so as to form particles of absorbent material devoid of outwardly projecting fibers and fiber ends.

2. A degradable absorbent material as set forth in claim 1 having a bulk density on the order of 6 lbs./ft.$^3$ to about 10 lbs./ft.$^3$.

3. A degradable absorbent material as set forth in claim 1 or 2 having hydrophilic properties.

4. A degradable absorbent material as set forth in claims 1 or 2 having hydrophobic properties.

* * * * *